Oct. 13, 1964   A. B. NEWLAND   3,152,443
GAS TURBINE POWERPLANT
Filed July 17, 1959   5 Sheets-Sheet 1

INVENTOR
ALLAN B. NEWLAND
BY *Charles A. Warren*
ATTORNEY

Oct. 13, 1964   A. B. NEWLAND   3,152,443
GAS TURBINE POWERPLANT
Filed July 17, 1959   5 Sheets-Sheet 5

INVENTOR
ALLAN B. NEWLAND
BY Charles G. Warren
ATTORNEY

United States Patent Office 3,152,443
Patented Oct. 13, 1964

3,152,443
GAS TURBINE POWERPLANT
Allan B. Newland, Longueuil, Quebec, Canada, assignor to United Aircraft of Canada Limited, a corporation of Canada
Filed July 17, 1959, Ser. No. 827,850
10 Claims. (Cl. 60—39.16)

This invention relates to a gas turbine powerplant and particularly to a powerplant in which the power turbine is rotatable individually of the gas generator or compressor-turbine assembly.

One feature of the invention is a two-part separable casing with the power turbine, power shaft and exhaust ducting in one part of the casing and with the gas producer or compressor-turbine assembly in the other part of the casing such that the power-turbine assembly may be removed or replaced as a unit. Another feature is the location of the burner construction for the gas producer such that it becomes accessible for removal or inspection by the removal of the power section.

One feature of the invention is the arrangement for mounting the accessory to the end of the gas producer assembly such that the accessory drive section is separable as a unit from the remainder of the powerplant together with an arrangement for providing a lubricant sump for the engine.

One feature is the accessibility of the first stage turbine for inspection when the power section is removed. Another feature is the removability of the first stage turbine disc without disturbing the remainder of the gas generator turbine or its mounting. This removability permits access to the first stage turbine nozzle for inspection, replacement or repair.

One feature of the invention is the assembly of the compressor rotor and stator.

Other features and advantages will be apparent from the specification and claims, and from the accompanying drawings which illustrate an embodiment of the invention.

FIG. 6 is a schematic longitudinal elevation view with parts in section showing the power section separated from the gas producer section and also showing the accessory section removed.

Figure 1:
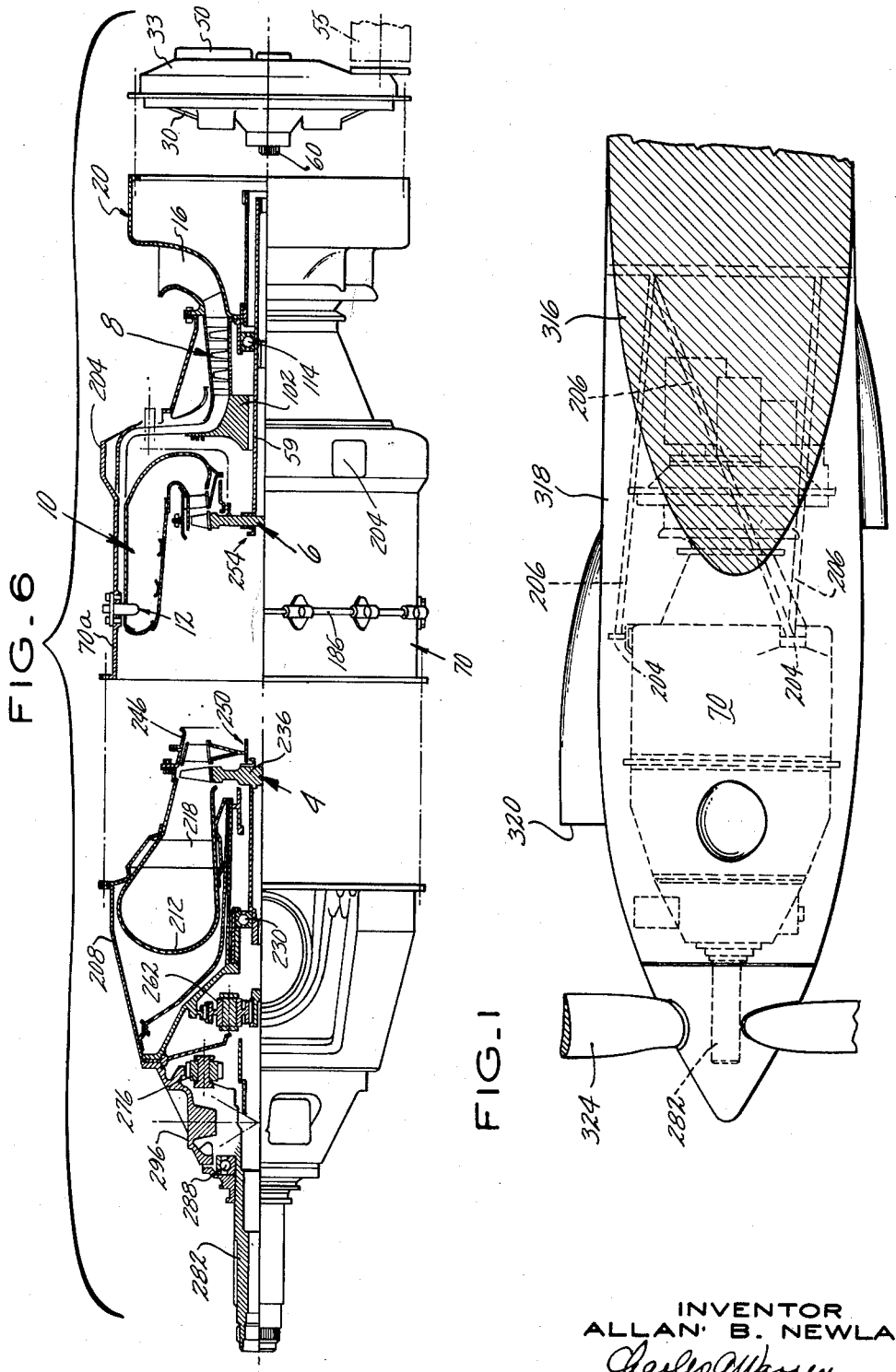
FIG. 1 is a side elevation showing the powerplant mounted on the wing of an aircraft.

Referring first to FIG. 6 which shows the power section of the powerplant separated from the gas producer section, the invention is shown in a powerplant adapted for delivering power to a power shaft 282 at one end of the powerplant, this shaft being driven by a turbine disc 4 which is free of the other turbine disc 6, the latter being the first stage of a two-stage turbine. The first stage disc 6 drives the compressor 8 and the compressed air from the compressor 8 passes through a burner 10 where fuel is added by the nozzles 12 and the products of combustion are discharged to the first stage turbine.

Figure 4:
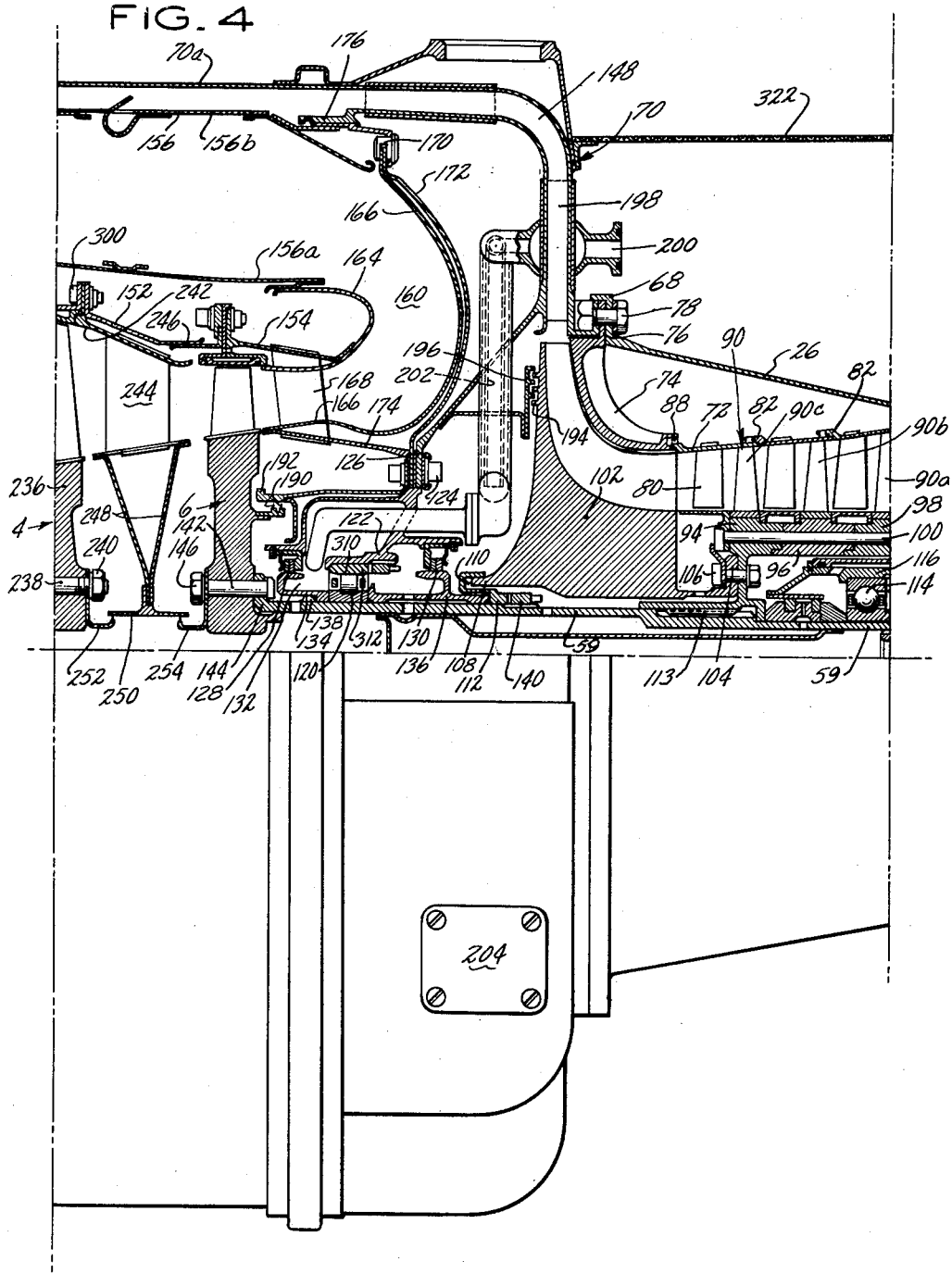
FIG. 4 is a longitudinal sectional view constituting an extension to the right of FIG. 3 showing the gas generator turbine and a part of the compressor.
Figure 5:
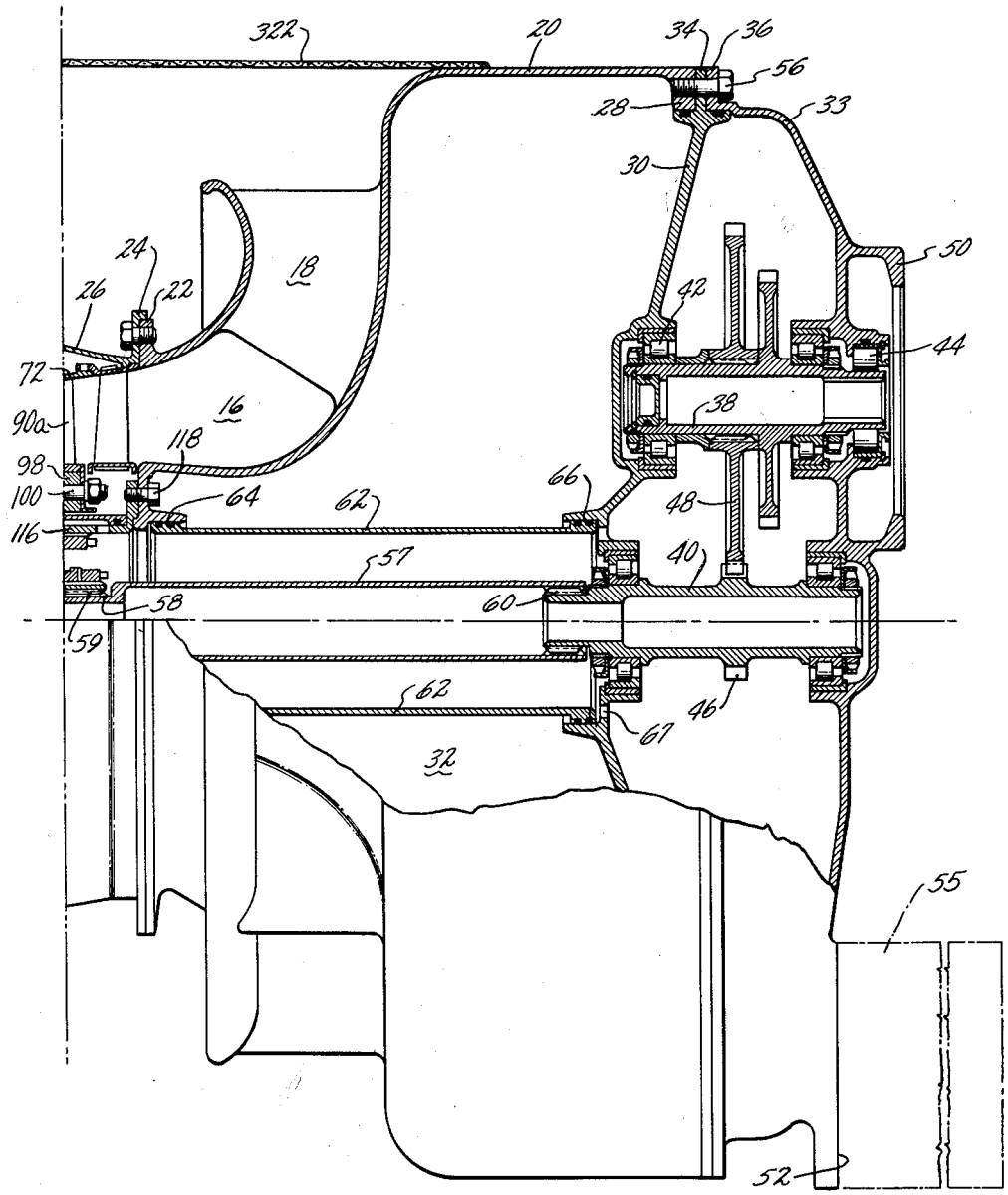
FIG. 5 is a longitudinal sectional view forming an extension to the right of FIG. 4 and showing primarily the accessory section of the engine.

As shown in FIGS. 4 and 5, the compressor inlet is in the form of an inlet duct 16 having guide vanes 18 therein. This inlet is formed on an inlet casing 20 having a flange 22 at its downstream end by which it is bolted to a cooperating flange 24 on the compressor casing 26. The inlet casing 20 at the end opposite to the flange 22 has a cooperating flange 28 to which is bolted an accessory mounting plate 30. This plate cooperates with the inlet casing to form an oil tank 32.

The accessory drive mechanism is mounted between the plate 30 and a cooperating plate 33, these plates having flanges 34 and 36, respectively, which are bolted to the flange 28. These plates are spaced apart and support a plurality of accessory drive shafts 38 and 40 in bearings 42 in the plate 30 and bearings 44 in the plate 33. The shaft 40 is driven directly from the engine and in turn drives the other accessory shafts through suitable gearing, such as the gears 46 and 48. The plate 33 has a mounting pad 50 for the attachment of an accessory to be driven by the shaft 38 and other pads, such as the pad 52, for the attachment of another accessory 55. It will be understood that the accessory section of the engine may be removed as a unit from the remainder of the engine by removing the bolts 56 holding the flanges 34 and 36 to the flange 28.

The accessory shaft 40 is driven through a quill 57 which has a spline connection 58 with the engine shaft 59 at one end and a spline connection 60 with the shaft 40 at the opposite end. A sleeve 62 surrounds the quill 57 in concentric relation thereto and has a fluid-tight engagement with a cylindrical surface 64 provided by the casing 20 and another cylindrical surface 66 provided by the plate 30. In this way lubricant from the oil sump 32 will not leak out of the sump 32 either into the accessory section or into the engine section. Any lubricant within the sleeve 62 drains into the accessory case through openings 67.

The compressor case 26 in addition to the flange 24, above described, has another flange 68 at the opposite end by which it may be bolted to the burner case and diffuser element 70. Inside of the compressor case 26 are mounted the vane supporting shroud rings 72 and the centrifugal compressor casing 74. Casing 74 carries a flange 76 held to the diffuser case by the same bolts 78 that hold the flange 68. Each shroud ring 72 carries a row of stator vanes 80 and is held in concentric relation to the adjacent shroud ring by piloting tongues 82. Relative rotation between adjacent shroud rings is prevented by interengaging lugs and notches, not shown, on adjacent shroud rings in any well known manner. The shroud 72 adjacent to the casing 74 engages axially extending pins 88 to prevent relative rotation. With this arrangement the several shroud rings 72 with the vanes attached thereon may be assembled axially by insertion through the downstream end of the compressor casing 26 and are held in place by the end clamping action of the flange 22.

The rows of vanes 80 cooperate with rows of blades 90 mounted on the compressor rotor 92. The rotor is made up of a disc 94 carrying the last row of blades 90c, the other rows of blades 90a and 90b being carried by separate rotor rings 96 and 98, respectively. These rings are bolted to the disc 94 as by a row of axially extending bolts 100.

The last stage of compression in the engine is accomplished by a centrifugal rotor 102 rotating with the rotor 92 and attached to the disc 94 as by a flange 104 and bolts 106. At the side of the rotor 102 opposite to the flange 104 is a projecting ring 108 engaging in a groove 110 in a ring 112 carried by the engine shaft 59. The disc 94 is splined to the engine shaft as at 113.

The engine shaft 59 is supported at its upstream end by a thrust bearing 114, the outer race of which fits within a sleeve 116 which is bolted to the inlet casing 20. The heads 118 for these bolts are accessible from the oil sump side of the casing for ease of separation, as will be apparent. The downstream end of the engine shaft 58 is supported by a radial bearing 120 carried by a housing 122 attached as by bolts 124 to a ring 126 forming an integral part of the diffuser case 70. The housing 122 carries spaced seals 128 and 130 to form an oil chamber 132 around the bearing. These seals engage with rings 134 and 136 mounted on the shaft 59. The rings 134 and 136 and also the ring 112 are clamped securely on the periphery of the shaft 59 with the inner race of the bearing 120 located between the two rings 134 and 136, this assembly of parts being clamped between a projecting rib 138 on the shaft and a clamping ring 140.

The first stage turbine disc 6 is held as by bolts 142 to a flange 144 on the downstream end of the shaft 59, the nuts 146 for the bolts 142 being located on the downstream side of the turbine disc for a purpose that will become apparent.

From the compressor rotor the air is directed radially outward through the diffuser passage 148 and then flows axially through an extension of this passage into the burner chamber which is located within the cylindrical portion 70a of the diffuser and burner casing. The inner wall of the burner chamber is defined by the outer wall 150, FIG. 3, of the turbine exhaust duct and by the outer shrouds 152 and 154 for the turbine. Within this burner chamber, which is annular about the axis of the engine, is mounted the annular flametube 156. This flametube is approximately U-shaped in cross section having a closed upstream end 158 remote from the diffuser passage 148 and having an open downstream end discharging into the turbine inlet duct 160.

The flametube 156 surrounds the turbine and has at its downstream end a slidable connection with the turbine duct 160. This duct is annular and a section through the annulus is substantially U-shaped having inner and outer walls 164 and 166. At their downstream ends the walls are held in spaced relation by the turbine inlet guide vanes 168 which project through the walls 164 and 166 and are brazed or welded therein.

The upstream end of the inner wall 164 is substantially cylindrical and has a slidable connection with the downstream end of the inner wall 156a of the flametube. The upstream end of the outer wall 166 has a locking connection with a ring 170 being preferably a breechblock or bayonet type of attachment. The ring 170 is carried by a part of the diffuser casing 70, as will be apparent. The wall 166 has a heat shield 172 extending in parallel relation to it being secured at its outer edge to ring 170 and at its inner edge to a shroud ring 174 which in turn is held by the row of bolts 124.

Figure 3:
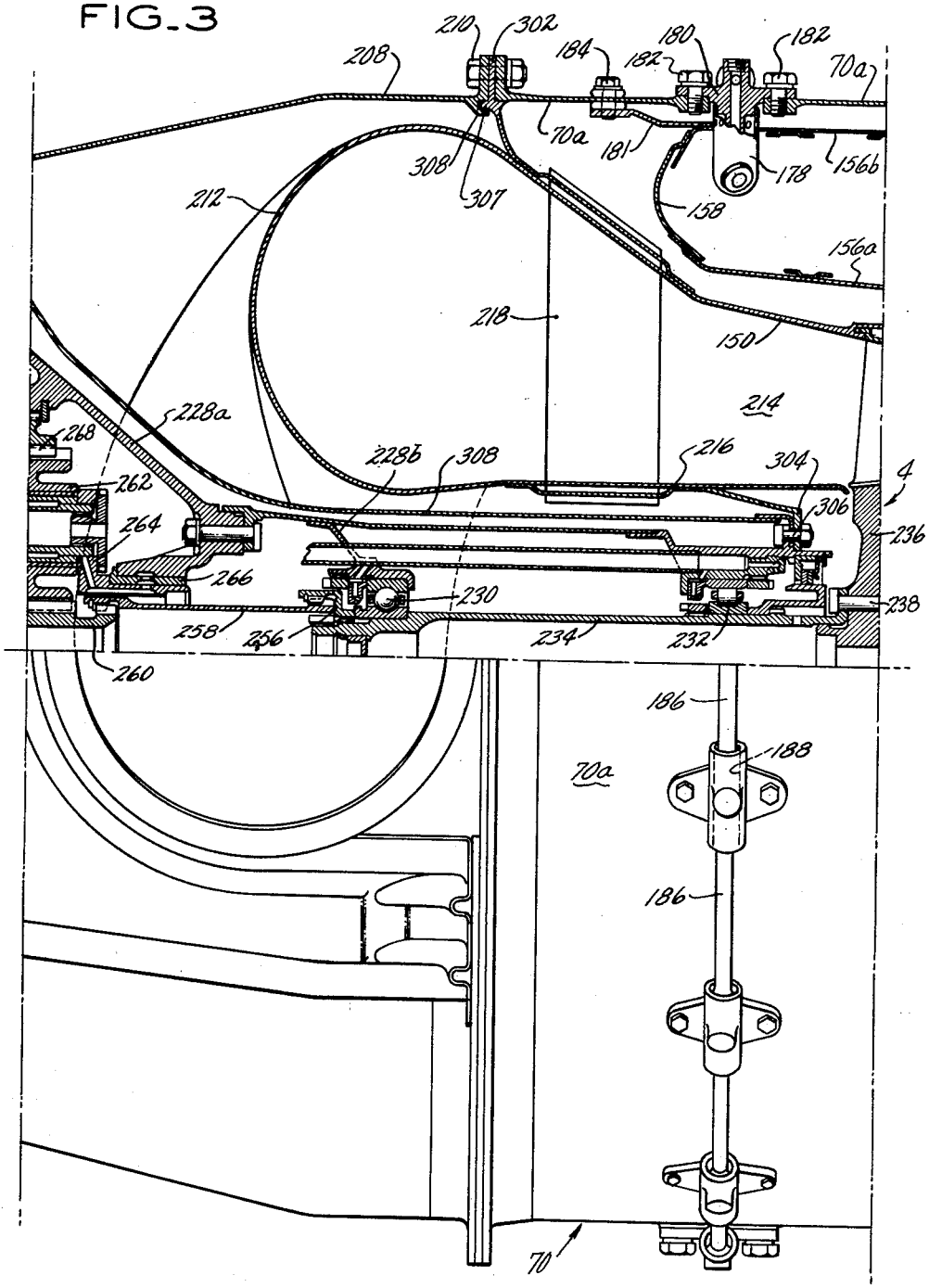
FIG. 3 is a longitudinal sectional view forming an extension to the right of FIG. 2 and showing primarily the power-turbine.

The outer wall 156b of the flametube has a slidable connection with a sleeve 176 forming a part of the diffuser casing 70. As shown in FIG. 3, the flametube has adjacent its closed upstream end a plurality of fuel nozzles 178. These nozzles extend through openings in the outer wall 156 of the flametube and have integral flange 180 held as by bolts 182 to the cylindrical portion 70a of the diffuser and burner casing. The flametube may be held in position by the piloting action of the nozzle 178 or by other suitable releasable attachment means. One form of attachment might be a plurality of angularly spaced clips of which one clip 181 is shown. Each clip 181 is brazed or otherwise attached at one end to the flametube 156 and has the opposite end engaged by a screw or bolt 184 extending through the wall 70a.

The several fuel nozzles are interconnected externally of wall 70a by short sections of tubing 186, the opposite ends of which are slidable in aligned bores 188 in each of the nozzle assemblies. With this arrangement, any one or more of the fuel nozzles may readily be removed for inspection or replacement. Suitable seals are provided between the ends of the tubes and the bores 188.

With respect to the gas generator part of the assembly which has just been described, it may be noted that the turbine disc 6 forming a part of this assembly is removable by the removal of the nuts 146. With this done the disc 6 is pulled axially off of the shaft 59 without affecting in any way the mounting for the shaft 59 or the compressor structure. Also the removal of the disc 6 permits access to the first stage nozzle vanes 168 so that these may be inspected. The disc 6 carries sealing fins 190 which engage with a cooperating stationary sleeve 192. The centrifugal compressor rotor 102 may also carry a series of sealing fins 194 cooperating with stationary sealing rings 196.

As the compressed gas leaves the centrifugal rotor 102, it enters the diffuser passage 148 and flows over a series of diffuser vanes 198 positioned in the passage. One of these vanes may have a passage therethrough for the supply of lubricant from an inlet passage 200 into a duct 202 and thence to the bearings 120.

The diffuser casing 70 has a plurality of angularly spaced engine mount ring brackets 204 thereon to which the engine mounts 206, FIG. 1, are attached and by which the engine is supported in or on the aircraft.

Figure 2:
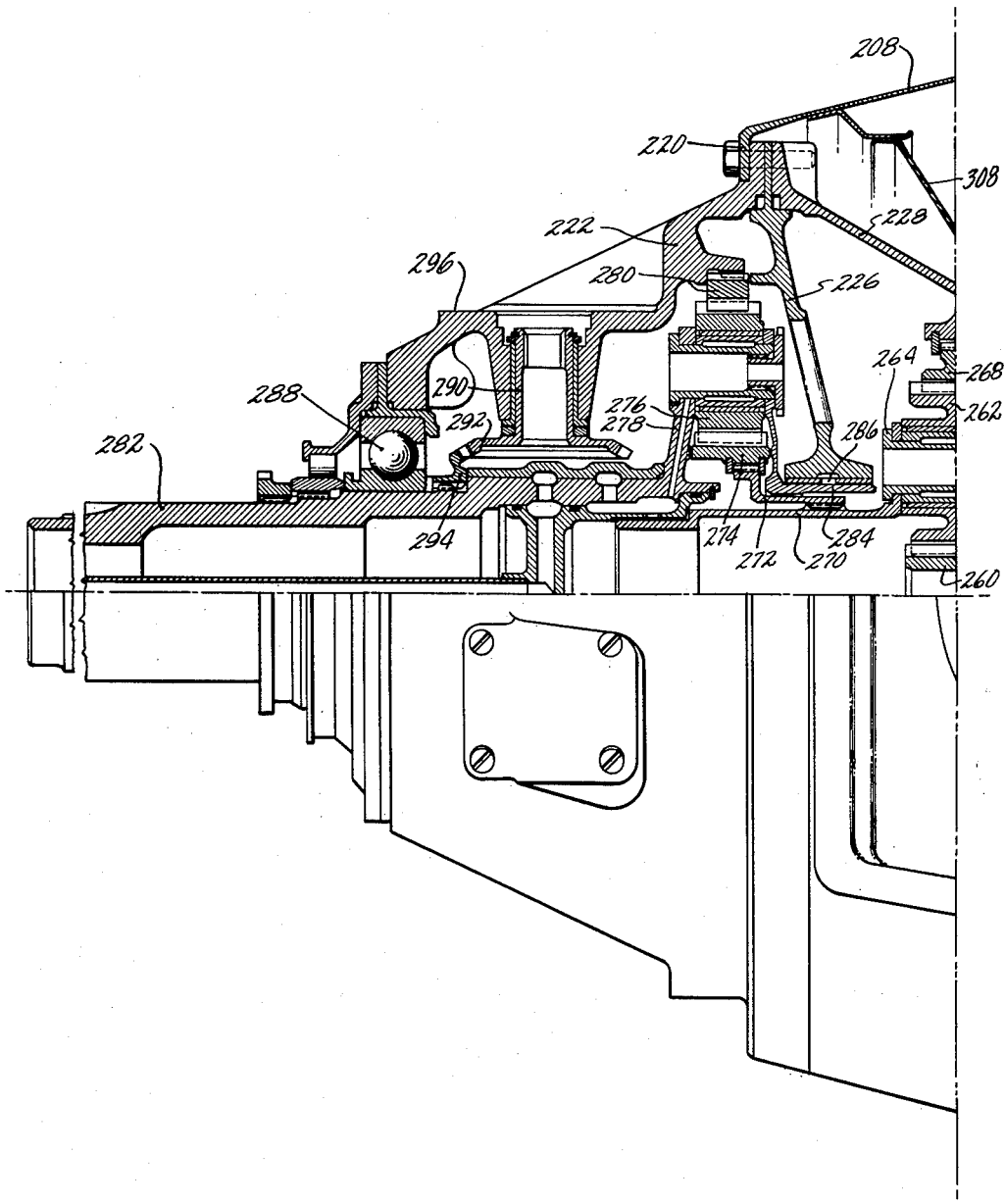
FIG. 2 is a longitudinal sectional view of a portion of the powerplant showing primarily the reduction gear for the propeller.

Referring now to FIGS. 2, 3 and 4, the power section of the powerplant is carried by an attachment casing 208 releasably secured as by bolts 210 to the end of the casing 70a. The casing 208 surrounds the turbine exhaust scroll 212 through which the exhaust gas is discharged from the engine. The scroll communicates with the exhaust duct 214, the outer wall 150 of which forms the inner wall of the combustion chamber, as above described, and the inner wall 216 of which is held in spaced relation to the outer wall by directional vanes 218. The casing 208 at its left-hand end has an inturned flange 220 to which is bolted the housing 222 for the gear reduction of the propeller. Also bolted to flange 220 are a bearing disc 226 and an inner housing 228 extending forwardly from the flange 220 to support the thrust bearing 230 and plain bearing 232 for the power shaft 234. The housing 228 consists of the conical member 228a and an approximately cylindrical built-up member 228b in which the bearings are mounted.

The power shaft 234 carries at its upstream end the power turbine disc 236, the latter being held thereon as by bolts 238. Removal of the nuts 240 on the bolts 238, these nuts being accessible at the upstream side of the disc, permits removal of the disc 236 once the power section has been withdrawn from the rest of the powerplant, as shown in FIG. 6.

The upstream end of the wall 150 has bolted thereto the shroud 242 for the support of the outer ends of the second stage vanes 244 and also supports the outer shroud 152, above described, which has an axially slidable connection with a ring 246 attached to the outer shroud 154 of the first stage turbine. This slidable connection permits separation of the second stage from the first stage in removal of the power section from the remainder of the powerplant, and serves as a pilot directing the second stage into concentric arrangement with the first stage in assembly of the device.

The inner ends of the vanes 244 support a diaphragm 248, the inner end of which carries a sleeve 250. This sleeve is in a position to engage with a sealing ring 252 on the upstream side of the disc 236 and another sealing ring 254 on the downstream side of the turbine disc 6. These sealing assemblies do not interfere with the axial separation of the first stage turbine from the second stage when the power section of the powerplant is separated from the gas generator section.

The power shaft 234 has a spline connection through a ring 256 to a quill 258 which in turn is splined to a pinion gear 260. This gear is in mesh with a plurality of surrounding planet gears 262 carried by a cage 264 supported by a bear 266 on the housing member 228a. The planet gears 262 are in mesh with a surrounding ring gear 268 splined to or otherwise held against rotation within the housing.

The cage 264 has a projecting sleeve 270 splined to a ring 272 carrying a gear 274. The gear 274 is in mesh with a plurality of pinions or planet gears 276 carried by a cage 278 and meshing with a ring gear 280 suitably splined to the gear housing 222. The cage 278 is an integral part of the propeller shaft 282. Thus, the power turbine shaft 234 may rotate at a suitable high speed for the turbine and this speed is geared down to a suitable speed for the propeller shaft through the two stages of gear reduction, just described. It may be noted that the cage 278 has an integral sleeve 284 supported within a bearing 286 on the inner periphery of the bearing support 226.

The propeller shaft 282 is supported by the bearing 286 through the cage 278 and is also supported by a thrust bearing 288, the latter being carried by the gear housing 222. Also carried by the gear housing are one or more radially extending shafts 290 on the inner end of which is mounted a bevel gear 292 in mesh with a cooperating gear 294 on the propeller shaft. Surrounding each of the shafts 290 adjacent their outer ends is an accessory mounting pad 296 for the mounting of the accessory to be driven by the shaft 290.

Referring now to FIG. 6, the power section of the powerplant is separable from the gas generator section by undoing the bolts 210 that hold the casing 208 to the casing ring 70a. When these bolts are removed the power section of the unit may be moved to the left, as shown in FIG. 6, carrying with it the turbine exhaust ducting and also the second stage turbine including both the stator and rotor. This separability is made possible by the sliding connection at the sleeve 246 and the axial movement permitted between the sleeve 250 and the seal 254. Once the power section has been withdrawn to the position of FIG. 6, the annular flametube may be withdrawn by undoing the bolts 184 and by removing the fuel nozzles 178. The separability of the flametube is permitted by the slidable connection between the inner wall 164 of the inlet duct and the inner wall 156a of the flametube and also by the slidable connection between the outer wall 156b of the flametube and the part 176 of the diffuser casing.

With the power section spaced from the rest of the powerplant, as in FIG. 6, the second stage nozzle may be inspected and if necessary removed by undoing the row of bolts 300 which holds the nozzle vane assembly to the outer exhaust duct wall 150. After removal of the second stage nozzle vanes the second stage turbine disc 236 may be removed by undoing the nuts 240. It will be apparent that the removal of this disc does not affect the mounting of the power shaft 234 in any way.

Further, disassembly of the power section is possible by removing the turbine exhaust duct as a unit. The outer wall 150 of this duct has a projecting flange 302 positioned against the end of casing 208. The inner wall of the exhaust duct has an inwardly projecting flange 304 attached as by bolts 306 to the substantially cylindrical bearing mounting 228. A heat shield 308 between the exhaust duct and the housing 228a and 228b is also held in position by the bolts 306. The opposite end of this heat shield has an axially slidable connection, as will be apparent. This flange 302 has piloting flanges 307 and 308 by which in assembly the casings 208 and 70a are made concentric.

With the power section in the position of FIG. 6, it is also possible, as above described, to remove, in addition to the flametube, the first stage turbine disc 6. To permit further disassembly of the gas producer section, the flange 144 on the end of the engine shaft 59 is smaller in outside diameter than the sealing surface on the ring 134. This latter in turn is smaller in diameter than the roll contacting surface 310 of the outer race 312 for the bearing 120. This surface in turn is smaller in diameter than the seal contacting surface of the seal ring 136. Thus, the housing 122 and the diffuser casing may be withdrawn axially from the compressor and engine shaft by undoing the row of bolts 78.

Referring now to FIG. 5, the accessory drive assembly with the accessory mounted thereon is also removable as a unit by removal of the row of bolts 56 which holds the accessory case to the compressor inlet casing 20. It will be understood that the sump 32 for lubricant will have been drained. The sliding action of the splined connection 60 and the sliding attachment of the sleeve 62 with the cylindrical surface 66 permits removal of the entire accessory section as a unit.

Referring now to FIG. 1, the engine in its entirety is shown mounted on the wing 316 of an aircraft and is enclosed within a fairing 318. This fairing in effect constitutes a plenum chamber with a forwardly facing inlet 320. Air entering this inlet is pressurized by ram action within the plenum chamber and from which chamber the air may pass through a screen 322 which surrounds the compressor and is attached to the diffuser casing 70. The other end of the screen will preferably have a sliding connection with the cylindrical portion of the inlet casing 20. The propeller 324 of FIG. 1 is mounted, as will be apparent, on the propeller shaft 282.

It is to be understood that the invention is not limited to the specific embodiment herein illustrated and described, but may be used in other ways without departure from its spirit as defined by the following claims.

I claim:

1. A gas turbine powerplant having a compressor rotor and stator, a first turbine rotor and stator, the turbine rotor and compressor rotor being connected together, and a power turbine stator and rotor, the latter rotor being mechanically independent of and closely adjacent to the first turbine rotor, the power turbine stator being closely adjacent to and receiving gas directly from the first turbine rotor, a two-part casing constituting a main part and an attachment part removably attached together and separable substantially along a plane at right angles to the longitudinal axis of the powerplant, the main part of the casing surrounding and having mounted therein the compressor stator and first turbine stator and having bearings supporting the interconnected compressor rotor and first turbine rotor, said attachment part of the casing supporting the power turbine stator and having bearings therein supporting the power turbine rotor, said attachment part of the casing also having an exhaust outlet for the turbines, a burner in said main part including a flametube mounted therein and surrounding the first turbine stator, said flametube having a closed end adjacent to the line of separation between the casings, and having axially sliding connections at its opposite end and radially extending means carried by said main part for retaining and supporting the flametube within the main part of the casing when the casing parts are axially separated.

2. A powerplant as in claim 1 in which the radially extending means removably securing the flametube includes a plurality of radially extending fuel nozzles attached to and extending through the first casing and into the flametube for the injection of fuel into the flametube.

3. A gas turbine powerplant as in claim 1 in which said main casing part forms an annular combustion space surrounding the turbine stator in which the flametube is located and into which the compressor discharges, an inlet duct for the turbine, said annular flametube having a discharge end opposite the closed end communicating with the inlet duct, said flametube having spaced, axially-extending inner and outer walls, the outer being spaced inwardly from said main part of the casing to define a path for air from said compressor, said axially slidable connections being between the flametube walls and the inlet duct to provide for axial removal of the flametube from the inlet duct, said removable means extending substantially radially inwardly from the casing and engaging the flametube for holding the flametube in position within the main casing part.

4. A gas turbine powerplant as in claim 3 in which the turbine inlet is adjacent the compressor rotor, the closed end of the flametube is remote from the turbine inlet and at the end of the flametube remote from the compressor rotor and the removable means comprises a plurality of circumferentially spaced radially extending fuel nozzles extending inwardly from said main casing part and into the flametube adjacent the closed end, a fuel system interconnecting said fuel nozzles, said fuel nozzles delivering fuel into the flametube and also retaining the flametube in operative position within the main casing part, said fuel system remaining intact when the casing parts are separated.

5. A gas turbine powerplant having a compressor rotor and stator, a first turbine rotor and stator, the turbine rotor and compressor rotor being connected together, and a power turbine stator and rotor, the latter rotor being mechanically independent of and closely adjacent to the first turbine rotor, the power turbine stator being closely adjacent to and receiving gas directly from the first turbine rotor, a two-part casing constituting a main part and an attachment part removably attached together and separable substantially along a plane at right angles to the longitudinal axis of the powerplant, the main part of the casing surrouding and having mounted therein the compressor stator and first turbine stator and having bearings supporting the interconnected compressor rotor and first turbine rotor, said attachment part of the casing supporting the power turbine stator and having bearings therein supporting the power turbine rotor, said attachment part of the casing also having an exhaust outlet for the turbines, a burner in said main part including a flametube mounted therein and surrounding the first turbine stator, said flametube having a closed end adjacent to the line of separation between the casings, and having axially sliding connections at its opposite end and means carried by said main part for retaining the flametube within the main part of the casing when the casing parts are axially separated, the main part of the casing having a turbine inlet duct for the first turbine positioned therein and closely adjacent the compressor rotor, the flametube being annular and concentric to the axis of the first turbine and being U-shaped in cross section with the base of the U located adjacent to the plane of separation of the casing parts and with the legs of the U extending in an axial direction toward the compressor casing for engagement with the turbine inlet duct.

6. A gas turbine powerplant having a compressor rotor and stator, a first turbine rotor and stator, the turbine rotor and compressor rotor being connected together, and a power turbine stator and rotor, the latter rotor being mechanically independent of and closely adjacent to the first turbine rotor, the power turbine stator being closely adjacent to and receiving gas directly from the first turbine rotor, a two-part casing constituting a main part and an attachment part removably attached together and separable substantially along a plane at right angles to the longitudinal axis of the powerplant, the main part of the casing surrounding and having mounted therein the compressor stator and first turbine stator and having bearings supporting the interconnected compressor rotor and first turbine rotor, said attachment part of the casing supporting the power turbine stator and having bearings therein supporting the power turbine rotor, said attachment part of the casing also having an exhaust outlet for the turbines, a burner in said main part including a flametube mounted therein and surrounding the first turbine stator, said flametube having a closed end adjacent to the line of separation between the casings, and having axially sliding connections at its opposite end and a series of fuel nozzles carried by said main part of the casing and extending radially through the casing and into the flametube to hold the flametube in axial position when the casing parts are separated.

7. In a gas turbine powerplant, a compressor including a rotor and a stator, a burner assembly into which air from the compressor is discharged, said assembly including fuel nozzles and at least one flametube, an axial flow turbine including a stator and rotor, a shaft extending between and connecting said rotors, a casing in which said stators and flametube are positioned, said casing having bearings positioned between said stators for the support of said shaft, said fuel nozzles extending substantially radially inward from the casing into the flametube and engaging therewith for retaining the latter in position within the casing, a second axial flow turbine coaxial with said first turbine and including a rotor having a row of blades, a power shaft therewith, and a stator having a row of vanes, a second casing in which said second turbine stator is mounted, said second casing having bearings therein for said power shaft and constituting the sole support for said second turbine rotor, said second casing having an exhaust duct and manifold means therein downstream of said second turbine rotor, a substantial portion of the exhaust duct forming a part of the inner wall of the burner assembly in spaced relation to the flametube, and means for securing said casings together in endwise engagement, such that said row of vanes is closely adjacent to and immediately downstream of the row of blades on the first turbine rotor for the delivery of fluid directly to said row of vanes from the row of blades, each of said casings having a peripheral attachment flange in a plane substantially at right angles to the longitudinal axis of the powerplant, and means for releasably securing said flanges in side-by-side engagement to provide for separability of the casings from each other, said fuel nozzles retaining the flametube in position within the first casing when the two casings are separated.

8. A powerplant as in claim 7 wherein the fuel nozzles are mounted externally of the first casing and extend radially through the casing and into the flametube such that removal of the fuel nozzles permits axial removal of the flametube when the casings are axially separated.

9. A gas turbine powerplant having a compressor rotor and stator, a first turbine rotor and stator and a power turbine rotor and stator, the power turbine rotor including a power shaft and being mechanically independent of the first turbine rotor, a two-part casing having the parts in end-to-end engagement and removably secured together, said casing parts being separable along a plane substantially at right angles to the longitudinal axis of the powerplant, one part of the casing supporting the compressor stator and first turbine stator therein and having bearings therein for the support of the compressor rotor and first turbine rotor, a shaft by which the compressor rotor and first turbine rotor are interconnected and which is journalled in the bearings, said one part of the casing having an annular flametube therein in surrounding relation to the first turbine rotor, said flametube having inner and outer radially spaced walls, and an integral outer end closure connecting said inner and outer walls, said one part of the casing also having a turbine inlet duct for directing gas to the first turbine stator, the outer wall of the flametube being radially inwardly spaced from said one part of the casing to define a path of air from the compressor to the flametube, opposite walls of the flametube at the end opposite the end closure engaging said inlet duct for directing gas from the flametube to the first turbine, and a plurality of fuel nozzles carried by and extending inwardly from said one part of the casing into the flametube for supporting the flametube as a unit in predetermined axial position within said one part of the casing when the casing parts are separated, the other casing part having bearings supporting the power turbine rotor and power shaft and having an annular portion in surrounding relation to the power turbine rotor and forming a duct defining surface within and spaced from the inner wall of the flametube, said annular portion supporting the power turbine stator adjacent to the first turbine rotor.

10. A gas turbine powerplant as in claim 9 in which said annular flametube has its inner and outer walls engaging with and axially slidable with respect to the inlet duct such that the flametube may be axially withdrawn as a unit from said one part of the casing by removal of the inwardly extending fuel nozzles from the one part of the casing after said other casing part with the power turbine rotor and stator therein has been separated from the first casing part.

References Cited in the file of this patent

UNITED STATES PATENTS

| | | |
|---|---|---|
| 2,672,010 | Newcomb | Mar. 16, 1954 |
| 2,687,860 | McNitt | Aug. 31, 1954 |
| 2,738,647 | Hill | Mar. 20, 1956 |
| 2,895,295 | Carlson | July 21, 1959 |
| 2,916,874 | Worobel | Dec. 15, 1959 |
| 2,956,404 | Kassner | Oct. 18, 1960 |
| 2,960,306 | Collman | Nov. 15, 1960 |
| 2,969,644 | Williams | Jan. 31, 1961 |
| 2,971,334 | Carlson | Feb. 14, 1961 |
| 3,088,278 | Franz | May 7, 1963 |

FOREIGN PATENTS

| | | |
|---|---|---|
| 1,030,068 | France | Mar. 11, 1953 |
| 689,353 | Great Britain | Mar. 25, 1953 |
| 1,198,540 | France | June 15, 1959 |